March 30, 1954
B. ROZETT
2,673,957
SHUNT FOR LOW-VOLTAGE CIRCUIT TESTERS
Filed July 6, 1951
2 Sheets—Sheet 1
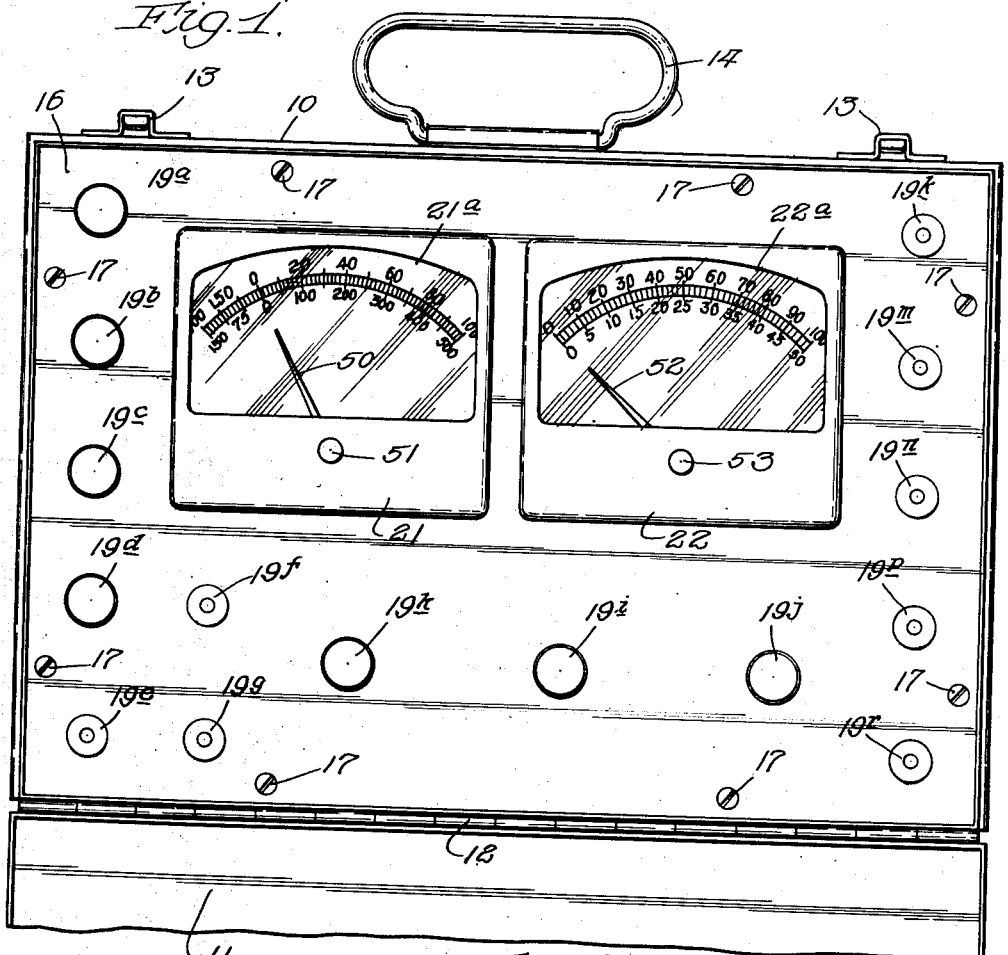
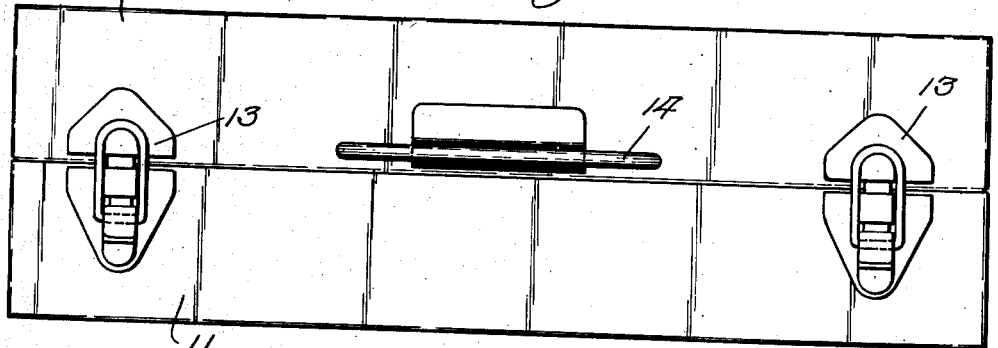
Inventor:
Benjamin Rozett,
By Schroeder, Merriam,
Holgren & Brady, Attys.

March 30, 1954
B. ROZETT
2,673,957
SHUNT FOR LOW-VOLTAGE CIRCUIT TESTERS
Filed July 6, 1951
2 Sheets-Sheet 2
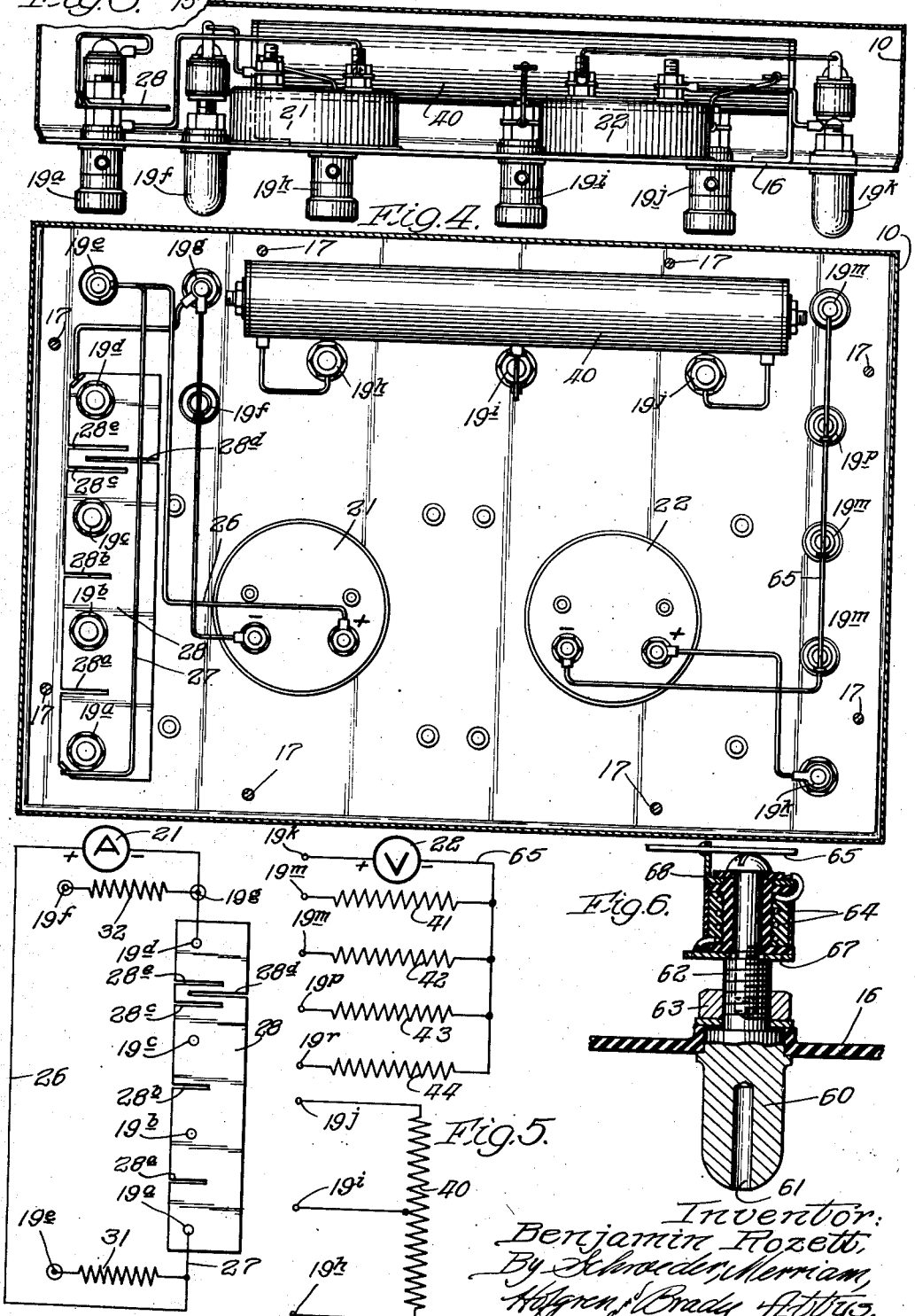
Inventor:
Benjamin Rozett,
By Schroeder, Merriam,
Hofgren & Brady, Attys.

Patented Mar. 30, 1954

2,673,957

UNITED STATES PATENT OFFICE 2,673,957

SHUNT FOR LOW-VOLTAGE CIRCUIT TESTERS

Benjamin Rozett, Chicago, Ill., assignor to Joseph Weidenhoff, Incorporated, a corporation of Illinois Application July 6, 1951, Serial No. 235,466

3 Claims. (Cl. 324—126)

This invention relates to circuit testing apparatus and more particularly to apparatus for making low voltage circuit tests.

This application is a continuation-in-part of my application Serial No. 44,906 filed August 18, 1948, now Patent 2,597,188 which issued May 20, 1952.

One feature of this invention is that it provides circuit testing apparatus whereby all necessary low voltage circuit tests may be performed on a vehicle, as for example, a tank by a unitary portable device; another feature of this invention is that it provides circuit testing apparatus comprising an ammeter having a plurality of ranges, and including selectively useable fixed resistances for performing certain tests, a voltmeter having a plurality of ranges, and apparatus for testing a battery or generator and all other devices included in the primary circuit under load or otherwise; still another feature of this invention is that while a plurality of meter ranges are provided, each range is connectable by means of a different terminal, thereby eliminating all switches with their attendant disadvantages; an additional feature of this invention is that it provides an ammeter having a continuous, one piece or single strip ammeter shunt which may be easily calibrated in spite of slight variations in the thickness of the metal; a further feature is that the ammeter binding posts or connector posts are directly connected to the one piece shunt; another feature of the invention is that the ammeter shunt has a plurality of terminals in series with a common terminal; still a further feature of the invention is that it provides three external terminals adapted to provide connections for external shunts, in which event the internal shunts mentioned above are no longer used as such in parallel with the meter, but are all connected in series therewith; and still an additional feature of the invention is that it provides a meter having a plurality of ranges and a scale comprising a combination of different indicia to provide indications over a plurality of ranges.

Other features and advantages of the invention will be apparent from the following specification and from the drawings in which:

Fig. 1 is a front elevational view of my improved circuit testing apparatus;

Fig. 2 is a top plan view thereof;

Fig. 3 is a sectional plan view, partially broken, showing the meters and the extent to which the terminals project beyond the meter faces;

Fig. 4 is a sectional view of the apparatus illustrating the ammeter shunt and the wiring of the meters;

Fig. 5 is a schematic diagram of the circuit of the apparatus; and

Fig. 6 is a sectional view of one of the resistor coils mounted on a jack.

In making low voltage tests of the electrical systems of vehicles, as for example the electrical system of a tank or administrative vehicle, it is necessary to make current or amperage tests, and voltage tests over a plurality of ranges. In the past no single unitary portable testing device has been devised for making all of the necessary tests, and most of the devices which have been used in performing the tests, in addition to being incapable of performing all the required tests, have had disadvantages in that they were easily broken, generally included switching arrangements between the ranges and included numerous different scales to cover the various meter ranges. Where the apparatus is subjected to extreme climatic conditions, as for example the hot, humid climate found in Africa or in the Pacific Islands, the switch contacts in such meters often develop high resistance and quickly destroy the accuracy of the meters.

I have devised and am herewith disclosing and claiming improved circuit testing apparatus particularly designed to perform all the low voltage tests which may be required in a vehicle, as for example in a tank or administrative vehicle. My apparatus comprises a compact unitary portable structure which is protected from damage in the event it is inadvertently knocked over, which eliminates the switching arrangements formerly found, and which is very readily used by a relatively unskilled operator and which includes a novel scale arrangement providing readily readable indications over a plurality of meter ranges with a minimum of scales. The apparatus illustrated is adapted to perform the following tests in the low voltage circuits of a tank or other vehicle: tests for voltage drops over all or any of the various portions of the low voltage circuit; tests of the battery and the individual cell voltages, both with and without load; tests of the starting motor, as for example the current draw under normal conditions and under lock torque where the tank is in gear and brakes are locked; tests of the generator output at various speeds and the gross input and net input to the battery with any or all of the various tank accessories drawing current; the electrical demands of the gun turrets and firing control equipment; and all other electrical functions of the low voltage circuits.

Referring now more particularly to the drawings the apparatus comprises a casing having a main body portion 10, a cover 11 connected to the casing 10 by means of a hinge 12. The cover 11 may be maintained in closed position by means of a pair of clasps 13. A handle 14 secured to the body portion 10 is used to carry the apparatus. The main body portion 10 includes a back 15 and a front or face portion 16. The interior of the cover 11 is utilized to carry testing accessories, as for example, leads, shunts, etc. The front portion 16 is secured to the body portion 10 by means of screws 17 which connect the front portion 16 to angle support members (not shown) connected to the main body portion 10.

The front portion 16 carries a plurality of terminals 19a—19r which project from the face of the casing a substantial distance as shown in Fig. 3 for a purpose to be hereafter described. The casing houses an ammeter 21 which has an indicating portion 21a in the face 16 of the casing, and a volt meter 22 which has an indicating portion 22a in the face of the casing.

The ammeter circuit may best be seen in Figs. 4 and 5. One side of the ammeter is connected to a common terminal 19a through a circuit of negligible resistance, this circuit including a lead 26 connected between the positive side of the meter (in the views shown) and the terminal 19e and a lead 27 connected to the common terminal 19a. This common terminal is connected to the other or negative side of the ammeter through a plurality of ammeter shunts incorporated in a single strip of material 28.

The single strip ammeter shunt 28 is composed of a conductor having a sufficiently high resistance for its effective operation as a shunt. A plurality of slots 28a–e control the resistance in any particular portion of the strip 28 and it is to be noted that each portion set off by the slots contains a terminal. Since it is desired that the resistance between the terminals 19a and 19b be the same as the resistance between the terminals 19b and 19c, the slots 28a and 28b are of equal length. However, it is desired that the resistance between the terminals 19c and 19d be higher. Consequently, there are three slots 28c—28e between these two terminals, the slots 28c and 28e being from one side of the strip and the slot 28d being from the other side of the strip. It may be seen that the path for the current to travel between terminals 19c and 19d must pass in the narrow area between slots 28c and 28d and slots 28d and 28e. This longer path through a high resistance of narrowed cross sectional area will naturally result in a considerable increase in the resistance between the terminals 19c and 19d as compared with the resistance between the terminals 19a and 19b or 19b and 19c. In this way the spacing of the terminals on the shunt strip may all be equal and yet the resistances between terminals be quite different.

In order to provide an accurate ammeter it is necessary that the resistances of the various portions of the shunt strip be carefully controlled. An example of how this may be done will be described with reference to the slot 28d. When the shunt strip is initially prepared, as by being stamped out, the slot 28e is not cut to its full required length but rather to a length where the resistance between the terminals 19c and 19d is lower than that desired. The terminals 19c and 19d are then connected with an instrument which is very accurate in determining the resistance between the two terminals. The slot 28e is then very carefully increased in depth by a hand-controlled cutting means until the resistance between the terminals 19c and 19e has reached the desired level. It is possible in this way to calibrate a shunt strip with great accuracy. Applying an insulating protective coating to the shunt strip will then help to keep its resistance properties constant.

The terminal 19c, which in the apparatus illustrated may be connected to provide a 50 ampere range on the meter, is connected to the negative side of the meter through only a portion of the shunt strip. Obviously, if is is desired to use the meter on a 50 ampere scale, the terminals 19a and 19c are connected in series in the circuit to be measured and with this arrangement, the portion of the shunt strip between the terminals 19a and 19c will be shunted across the series combination of the meter and the portion of the shunt strip between terimnals 19c and 19d. The terminal 19b is designed to provide a 100 ampere range on the meter while the terminal 19d will provide a 10 ampere range.

Obviously, as many ranges as desired may be provided without switching, the construction being such that the various ranges are made by using all or certain portions as desired of the shunt strip across the series combination of the meter and the remaining portion of the shunt strip, if any.

In addition, to the internal shunt consisting of the shunt strip 28 an external shunt may be connected to the meter circuit by means of plugs. The terminal 19e is like that illustrated in Fig. 6 and includes a 3-ohm resistance 31. The terminal 19e is a common terminal when the external shunt is used. When the external shunt is used the millivolt drop across the shunt is impressed upon a series circuit, one portion of the series circuit being the three-ohm resistance of terminal 19e and the other portion being the parallel combination of the internal shunt strip 28 and the meter.

The external shunt gives a dual range. In order to do this the negative lead from the ammeter 21 is shifted so as to include a dropping resistance which allows only the desired portion of the voltage drop across the shunt to be impressed across the meter. Thus, a higher current must flow through the shunt to give the same meter deflection.

In order to use the meter for the 500 ampere range an external shunt will be connected from the terminal 19e to the terminal 19g. If a range of an order of 1000 amperes is to be used an external shunt will be connected from the terminal 19e to the terminal 19f. The terminal 19f incorporates a resistance element 32 which also is of the type shown in Fig. 6. This dropping resistance is preferably of the order of 2.13 ohms in the circuit shown. Where the 1000 ampere range is used the current to the meter flows through both the 2.13 ohm and the 3 ohm resistances.

The provision of an ammeter having a plurality of ranges together with the combination of a selectively operable variable resistance for performing certain tests is novel and results in a device of far greater utility than has heretofore been found in the art since all of the necessary current tests may be performed by a single device. The further provision of a separate terminal for each range simplifies the use of the apparatus and aids in preventing the apparatus from being used on the wrong range since it is necessary for the operator consciously to connect the apparatus to the circuit he desires to test, and consequently it is highly unlikely that the 10 ampere terminal 19d would be connected by the operator into a high current circuit. Furthermore, the provision of the series-connected shunts entirely eliminates the necessity of switching between shunts, and if the apparatus is utilized in a damp or humid climate there are no concealed switches to corrode, become covered with fungus, or otherwise deteriorate, and there is no possibility that a high resistance will develop across the meter, thus destroying its utility as an ammeter. The necessity of connecting an external shunt for excessive high amperage ranges will act as a warning to the operator and remind him that high currents are present, and again it is not necessary to switch between shunts since the three series-connected portions of the shunt strip 28 merely become connectors in parallel with the meter when a high range external shunt is connected across the terminals 19e and 19g.

Another resistor 40 which may have a value of 1.5 ohms is mounted in the casing, the opposite ends of this resistor being connected to the terminals 19h and 19j while the center tap of the resistor is connected to the terminal 19i. These terminals may be used in making certain tests upon the voltage regulator, the terminals 19h and 19i being connected in the circuit for 6 volt tests and the terminals 19h and 19j being connected in the circuit for 12 volt tests.

The voltmeter 22 is also connected to provide a plurality of ranges. The common (here shown as the positive) side of the meter is connected to the terminal 19k, and the negative side of the meter is connected to the terminals 19m—19r in parallel. As illustrated, a resistor 41, which may have a value of 50,000 ohms, is connected in series between the terminal 19m and the negative side of the meter to provide a 50 volt range; a resistor 42, which may have a value of 20,000 ohms, is connected in series between the terminal 19n and the negative side of the meter to provide a range of 20 volts; a resistor 43, which may have a value of 10,000 ohms, is connected between the terminal 19p and the negative side of the meter to provide a 10 volt range; and a resistor 44, which may have a value of 1,000 ohms, is connected between the terminal 19r and negative side of the meter to provide a one volt range.

Again as in the case of the ammeter there are no switches to be operated in the volt meter circuits and there can be no abnormal high resistance connections which develop because of climatic or other conditions in use, and as the case in the ammeter circuits it is necessary for the operator consciously to connect a lead to one of the terminals in order to operate the meter, thereby minimizing the possibility that the operator will attempt to use the meter across a high voltage circuit when it is arranged to operate on one of its lower ranges.

The resistances 31, 32, 41, 42, 43 and 44 are of the type illustrated in Fig. 6. In this figure a jack 60 protruding from the face 16 of the mounting panel has a receptacle 61 into which a plug may be inserted. A mounting rod 62 is threadably attached to the jack 60 on the part which extends through to the back side of the panel 16. A nut 63 threaded on the mounting rod 62 maintains the assembly in mounted position upon the panel 16. A resistance coil 64 is wound around the mounting rod 62, the lower end of the coil in the view shown being attached to a solder lug 67. The upper end of the coil 64 is connected through an insulated solder lug 68 to a conductor 65 leading from the negative terminal of the volt meter 22. With this construction, when a plug is inserted in the receptacle 61 a conducting path is set up which passes from the jack 60 through the mounting rod 62 and the resistance coil 64 to the conductor 65. Referring to Fig. 5, it may be seen that the resistance 41 may be included in the circuit if plugs are connected to the terminals 19m and 19k. If it is desired to include the resistance 42 in a circuit, plugs will be connected to the terminals 19n and 19k. In a similar manner resistances 43 and 44 may be connected in the circuit.

In addition to the electrical advantages found in my circuit testing apparatus, there are certain mechanical advantages provided. Referring particularly to Figs. 1 and 3 it will be seen that the terminals 19 project a substantial distance from the face of the casing and the arrangement of the terminals on the face is such that the terminals will support the casing in the event the device is knocked over on its face and the indicating portions of the meters (which normally are glass enclosed) will be protected against damage. By this arrangement the same terminals which provide an electrical function are arranged to provide a mechanical advantage not found in other devices.

In addition I have provided an arrangement wherein, despite the large number of meter ranges, a minimum of scales are utilized and each scale comprises a combination of different indicia to provide readily readable indications over a plurality of ranges. Referring first to the indicating portion 21a of the ammeter 21, the meter pointer or needle 50 may be adjusted by means of an adjusting screw 51 to give a zero reading when the meter is disconnected as shown. Preferably the zero point on the ammeter scale is not at the extreme left of the scale since certain types of apparatus to be tested, as for example reverse current relays, utilize a negative polarity current. Despite the fact that the ammeter illustrated has 5 ranges of maximum deflection, as 10, 50, 100, 500 and 1,000 amperes, there are only two scales and each scale provides indications over a plurality of ranges. The top scale may be utilized to read the current for the ranges of 10, 100 and 1,000 amperes and the bottom scale may be utilized for the ranges of 50 and 500 amperes. I achieve this desirable result by forming the numbers of each scale of a combination of different colors. For example, the second number of each scale marking in the top scale may be formed of a different color than are the first and third numbers, the farthest number to the left in Fig. 1 (the number 300) appearing as a black three, a red zero, and a black zero. Thus when utilizing the 10 ampere range only the first number is used and if the pointer 50 swings to this far left position the operator will know that a current of 3 amperes is flowing in the circuit. If the range is 100 amperes the black three and red zero will be utilized and the operator will know that 30 amperes are flowing in the circuit while if the thousand ampere range is utilized the operator reads all three numbers and it will be apparent that 300 amperes are flowing in the circuit. Similarly, on the bottom scale the different colored indicia provide a ready differentiation between the 50 ampere range and 500 ampere range. For example, referring to Fig. 1, the highest number (500) on this scale comprises a black five, a black zero, and a red zero. For the 50 ampere range only the black numbers are used and for the 500 ampere range all the numbers are used. In both the upper and lower scales the reference number at the right end or high end of the scale will show the operator the maximum deflection of the range he is working on, thereby minimizing any chance for error.

Similarly, in the voltmeter 22 only three scales are necessary despite the fact that the meter covers four ranges. In this meter, as shown in Fig. 1, a pointer 52 normally zeros at the left end of the scale, an adjusting screw 53 being provided to set the zero point. As shown in Fig. 1 the scale at the top is used for maximum deflection ranges of one volt and 10 volts despite the fact that there is only one set of numbers on this scale. I prefer that the numbers be black and that at each unit mark there is a decimal point of a different color, as for example red. Thus when using the one volt scale the operator will read the numbers including the decimal point as indicated by the highest number on the scale, and when using the 10 volt scale the operator will read the black numbers while ignoring the red decimal points, the different colors serving to facilitate the reading of the scale. There are two lower sets of numbers in vertical alignment to provide maximum deflection ranges of 20 volts and 50 volts. I prefer that these sets of numbers be of different colors, as for example the 20 volt scale utilizing black numbers and the 50 volt scale utilizing red numbers.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In circuit testing apparatus having an ammeter, shunt means of the character described, comprising: an elongated strip of resistance material providing a meter shunt operably connected to said ammeter; and at least three terminals directly mounted in spaced relation on said strip of resistance material, providing a plurality of ranges for said ammeter.

2. In circuit testing apparatus having an ammeter, shunt means of the character described, comprising: an elongated strip of resistance material operably connected to said ammeter, providing a meter shunt; a first terminal directly mounted on said strip of resistance material at one end thereof; a second terminal directly mounted on said resistance strip at the other end thereof; and at least one terminal directly mounted on said resistance strip at a point intermediate said first and second terminals, there being at least one transverse calibration slot cut in said resistance strip between each pair of terminals.

3. In circuit testing apparatus having an ammeter, shunt means of the character described, comprising: an elongated rectangular strip of resistance material operably connected to said ammeter providing a shunt therefor; a first terminal directly mounted on said resistance strip at one end thereof; a second terminal directly mounted on said resistance strip at the other end thereof; a third terminal directly mounted on said resistance strip at a point intermediate said first and second terminals; and a fourth terminal directly mounted on said resistance strip at a point intermediate said second and third terminals, there being a plurality of transverse calibration slots cut in said resistance strip and extending inwardly from a longitudinal side thereof, at least one of said slots being between each adjacent pair of terminals, said first and second terminals providing a low range ammeter, said first and fourth terminals providing a medium range ammeter and said first and third terminals providing a high range ammeter.

BENJAMIN ROZETT.

References Cited in the file of this patent

UNITED STATES PATENTS

| Number | Name | Date |
|---|---|---|
| 846,969 | Wohl | Mar. 12, 1907 |
| 892,554 | Roller | July 7, 1908 |
| 1,705,301 | Miller | Mar. 12, 1929 |
| 1,901,343 | Eastham | Mar. 14, 1933 |
| 1,951,799 | Lederer | Mar. 20, 1934 |
| 2,183,617 | Kurz | Dec. 19, 1939 |
| 2,384,350 | Skulley | Sept. 4, 1945 |
| 2,507,803 | Miller | May 16, 1950 |

FOREIGN PATENTS

| Number | Country | Date |
|---|---|---|
| 16,159 of 1903 | Great Britain | July 22, 1903 |
| 3,809 | France (Addition to No. 319,883) | Feb. 25, 1905 |
| 367,085 | Great Britain | Feb. 18, 1932 |
| 770,413 | France | Sept. 13, 1934 |
| 770,781 | France | Sept. 20, 1934 |
| 641,381 | Germany | Jan. 29, 1937 |

OTHER REFERENCES

Publication, "Radio Master," published by United Catalog Publishers, Inc., New York city 13, N. Y., Copyright 1944, pages F 27, N-3. (Copy in Div. 69.)

Publication, "General Electric Review," published by General Electric Co., June 1946, page 58. (Copy in Div. 69.)